US009277122B1

(12) United States Patent
Imura et al.

(10) Patent No.: US 9,277,122 B1
(45) Date of Patent: Mar. 1, 2016

(54) SYSTEM AND METHOD FOR REMOVING CAMERA ROTATION FROM A PANORAMIC VIDEO

(71) Applicant: Legend3D, Inc., Carlsbad, CA (US)

(72) Inventors: Ken Imura, Escondido, CA (US); Ryan Cummins, Van Nuys, CA (US)

(73) Assignee: LEGEND3D, INC., Carlsbad, CA (US)

(*) Notice: Subject to any disclaimer, the term of this patent is extended or adjusted under 35 U.S.C. 154(b) by 0 days.

(21) Appl. No.: 14/825,746

(22) Filed: Aug. 13, 2015

(51) Int. Cl.
*H04N 7/00* (2011.01)
*H04N 5/232* (2006.01)
*G06T 19/00* (2011.01)
*G06T 7/00* (2006.01)

(52) U.S. Cl.
CPC .......... *H04N 5/23238* (2013.01); *G06T 7/0042* (2013.01); *G06T 19/003* (2013.01); *G06T 19/006* (2013.01); *G06T 2200/04* (2013.01); *G06T 2207/10016* (2013.01)

(58) Field of Classification Search
CPC ............ H04N 5/23238; H04N 1/3876; H04N 5/3415; G06T 2200/32; G06T 3/4038; G06T 15/20; G06T 15/08
USPC ....................................................... 348/36, 37
See application file for complete search history.

(56) References Cited

U.S. PATENT DOCUMENTS

| | | | | |
|---|---|---|---|---|
| 5,130,794 A * | 7/1992 | Ritchey | ..................... | F41G 7/30 348/383 |
| 5,594,845 A * | 1/1997 | Florent | .................... | G06T 15/20 345/427 |
| 2002/0018047 A1* | 2/2002 | Okada | ..................... | B60Q 9/005 345/156 |
| 2004/0032407 A1* | 2/2004 | Ejiri | ..................... | H04N 13/0278 345/419 |
| 2004/0066449 A1* | 4/2004 | Givon | ..................... | G03B 35/00 348/48 |
| 2004/0247173 A1* | 12/2004 | Nielsen | ................. | G06T 3/0062 382/154 |
| 2008/0024523 A1* | 1/2008 | Tomite | .................... | G06T 15/50 345/632 |
| 2013/0044108 A1* | 2/2013 | Tanaka | .................... | G06T 15/04 345/419 |
| 2015/0229840 A1* | 8/2015 | Sawai | ....................... | G06T 3/00 348/36 |

FOREIGN PATENT DOCUMENTS

JP   WO 2014064783 A1 * 5/2014 ................ G06T 3/00

* cited by examiner

*Primary Examiner* — Sath V Perungavoor
*Assistant Examiner* — Nathnael Aynalem
(74) *Attorney, Agent, or Firm* — ARC IP Law, PC; Joseph J. Mayo (57) ABSTRACT

Removes undesirable camera rotation from a panoramic video. Video frames are mapped to a sphere and then projected to a forward-looking planar video. Camera tracking or other techniques are used to derive camera position and orientation in each frame. From the camera orientation, a correcting rotation is derived and is applied to the sphere onto which the panoramic video was mapped. Re-projecting video from the rotation-corrected sphere reduces or eliminates camera rotation artifacts from the panoramic video. Rotation may be re-introduced and other visual effects may be added to the stabilized video. May be utilized in 2D virtual reality and augmented reality displays. Depth may be accepted by the system for objects in the video and utilized to create 3D stereoscopic virtual reality and augmented reality displays.

19 Claims, 9 Drawing Sheets
(8 of 9 Drawing Sheet(s) Filed in Color)

SYSTEM AND METHOD FOR REMOVING CAMERA ROTATION FROM A PANORAMIC VIDEO

BACKGROUND OF THE INVENTION

1. Field of the Invention

One or more embodiments of the invention are related to the field of image processing. More particularly, but not by way of limitation, one or more embodiments of the invention enable a method to remove or otherwise alter camera rotation from or in a panoramic video to facilitate creation of 2D and 3D virtual reality experiences from the stabilized video, including addition of visual effects and depth.

2. Description of the Related Art

Methods for generating panoramic images from a series of images are known in the art. These methods stitch images together to form wide field of view composite images. These methods may also be applied to video, where videos captured by multiple cameras are stitched together to form panoramic videos.

The video capture process for panoramic video may introduce undesired artifacts. For example, camera motion during capture may create rotations, shaking, or other artifacts. Reducing or eliminating these artifacts is desirable in many applications. While techniques for stabilizing individual video captures are known in the art, these techniques may not be applied directly to panoramic video because of the complexity of process for integrating video streams into a panoramic video. Individually correcting each video is not sufficient to generate a corrected panoramic video. Artists may in some cases manually correct each individual frame of a panoramic video to reduce or eliminate artifacts, but these procedures are extremely time-consuming and labor intensive.

The addition of visual effects or depth to a non-stabilized video requires more time and produces lower quality virtual reality experiences in 2D and 3D.

For at least the limitations described above there is a need for a method for removing camera rotation from a panoramic video.

BRIEF SUMMARY OF THE INVENTION

One or more embodiments described in the specification are related to a system and method for removing camera rotation from a panoramic video. Panoramic videos of an environment are frequently captured using moving cameras. For example, a user may move a multi-camera system through a scene to capture views of the scene from a variety of positions and angles. Frequently as cameras move through a scene, they inadvertently rotate in undesirable ways; for example, the cameras may pitch or roll back and forth while capturing the scene. Use of stabilized mounts to eliminate rotation at the source is not always possible or desirable. Therefore, post-processing the captured panoramic video to eliminate the effect of undesired camera rotations is often desirable.

One or more embodiments of the invention provide a method for removing camera rotation from a panoramic video. The input to one or more embodiments of the method is a panoramic video of a scene captured in a three-dimensional space. In one or more embodiments the panoramic video is mapped onto a sphere, to form a spherically mapped panoramic video. One or more embodiments may utilize other geometries for panoramic video, such as for example a cylinder or a cube. To correct undesirable camera rotation, one or more embodiments analyze the frames of the panoramic video to determine the camera rotation for each frame, relative to some reference axes defined for the scene. Embodiments may use any desired reference axes, such as for example a y-axis pointing upwards from the ground, a z-axis pointing towards a viewer from a principal viewpoint direction (which depends on the application), and an x-axis orthogonal to the y and z axes.

Deriving camera rotation directly from a spherically mapped panoramic video may be complex; therefore one or more embodiments projects the spherically mapped panoramic video onto a front plane, to generate a forward-looking planar video. The direction of the front plane depends on the application and on the geometry of the scene. The forward-looking planar video may then be analyzed using image processing techniques known in the art for single camera video streams to derive the orientation and position of the virtual camera for this planar video in each of its frames. The camera rotation in each frame may then be determined based on the orientation of the virtual camera relative to the reference axes for the scene. Applying this camera rotation to the sphere of the spherically mapped panoramic video removes the undesired camera rotation from each frame, resulting in a rotation-corrected panoramic video.

One or more embodiments of the method may generate a panoramic video from a set of individual videos captured by different cameras over the same time period. In some embodiments a preprocessing step may be used to synchronize the videos to a common frame rate, format, starting time and ending time, or to other parameters. One or more embodiments may generate a spherically mapped panoramic video from these individual videos by taking the camera frames from the videos that were sampled at the same frame time, or at approximately the same time, and mapping these camera frames onto a sphere to form a spherically mapped frame. The sequence of all spherically mapped frames forms the spherically mapped panoramic video. One or more embodiments may generate a panoramic video onto other surfaces, such as for example a cylinder or a cube. One or more embodiments may obtain individual videos that cover only a subset of the spherical surface (or other surface), and may generate a panoramic video that does not have a full 360-degree horizontal field of view or a full 180-degree vertical field of view.

Methods for stitching together images from different cameras onto a sphere are known in the art. Embodiments of the invention may use any of these methods to generate a panoramic video. In some embodiments the relative orientation of individual cameras to one another is known; in these cases, the mapping of individual frames onto a sphere (or other surface) may for example use these known relative orientations. For example, in one or more embodiments individual videos may be obtained from multiple cameras that are all attached to or integrated into a common camera mount. The mount may be optionally moved through as scene to capture video from each camera. For example, in one or more embodiments a camera mount may be attached to a drone, which moves through a scene during capture. The orientation of the cameras relative to the mount, and hence to one another, may therefore be fixed throughout the video capture. In these embodiments, mapping individual frames to a sphere may be performed by generating a reference sphere surrounding the camera mount, and generating a spherical region for each camera that is the intersection of the camera's field of view with the surface of the reference sphere. Mapping a camera's frames to a sphere may then be done by mapping each frame to the camera's corresponding spherical region on the reference sphere. One or more embodiments may further blend the frames on the sphere (or on another surface) to account for difference in lighting conditions, shadows, slight camera misalignments, or other factors that require adjustment. Methods for blending images as part of a panoramic stitching process are known in the art and embodiments may employ any of these methods to form a panoramic video.

One or more embodiments may derive camera rotation and translation from the forward-looking planar video using camera tracking techniques known in the art. These camera tracking techniques may for example use a set of features in each frame that correspond to objects with fixed locations in the scene. The pixel location of each feature may be tracked across the sequence of forward-looking video frames. From these feature tracks, one or more embodiments may calculate the 3D position of each feature in the scene, as well as the orientation and position of the virtual camera that captured each frame. For example, one or more embodiments may generate a 3D geometry model with the position of features and the camera position and orientation in each frame, where this 3D geometry model provides a best fit to the observed feature tracks across frames. The camera rotation in each frame may then be obtained from the 3D geometry model as the orientation of the virtual camera relative to the reference axes for the scene.

One or more embodiments may further generate a virtual reality environment from the 3D geometry model obtained by analyzing feature tracks (or derived from other methods). Images may be generated for a viewer in the virtual reality environment by placing an image plane in the 3D geometry model that corresponds to the viewer's location and orientation in the virtual environment, and projecting the features of the 3D geometry model onto this image plane. The image plane is the plane for a viewer virtual camera that is based on the viewer's position and orientation. One or more embodiments may also integrate the panoramic video with the 3D geometry model to provide an enhanced virtual reality environment that uses the captured video combined with the 3D geometry to generate photo-realistic virtual reality images that reflect the 3D depth of the scene.

In one or more embodiments, depth may be applied using masks or regions in an image to create stereoscopic images. By stabilizing the image rotation before doing so, much labor may be saved. This enables artists to focus on the addition of visual effects and depth and enables the artists to produce better quality virtual and augmented reality experiences in both 2D and 3D in a given amount of time.

Picture information from a drone for example including but not limited to the rigging, propellers and shadow of the drone, may be removed using pixels from subsequent or previous images for example. Any other type of augmented reality information may also be added to each resulting image to provide additional information for the viewer.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects, features and advantages of the invention will be more apparent from the following more particular description thereof, presented in conjunction with the following drawings wherein.

DETAILED DESCRIPTION OF THE INVENTION

A system and method for removing camera rotation from a panoramic video will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
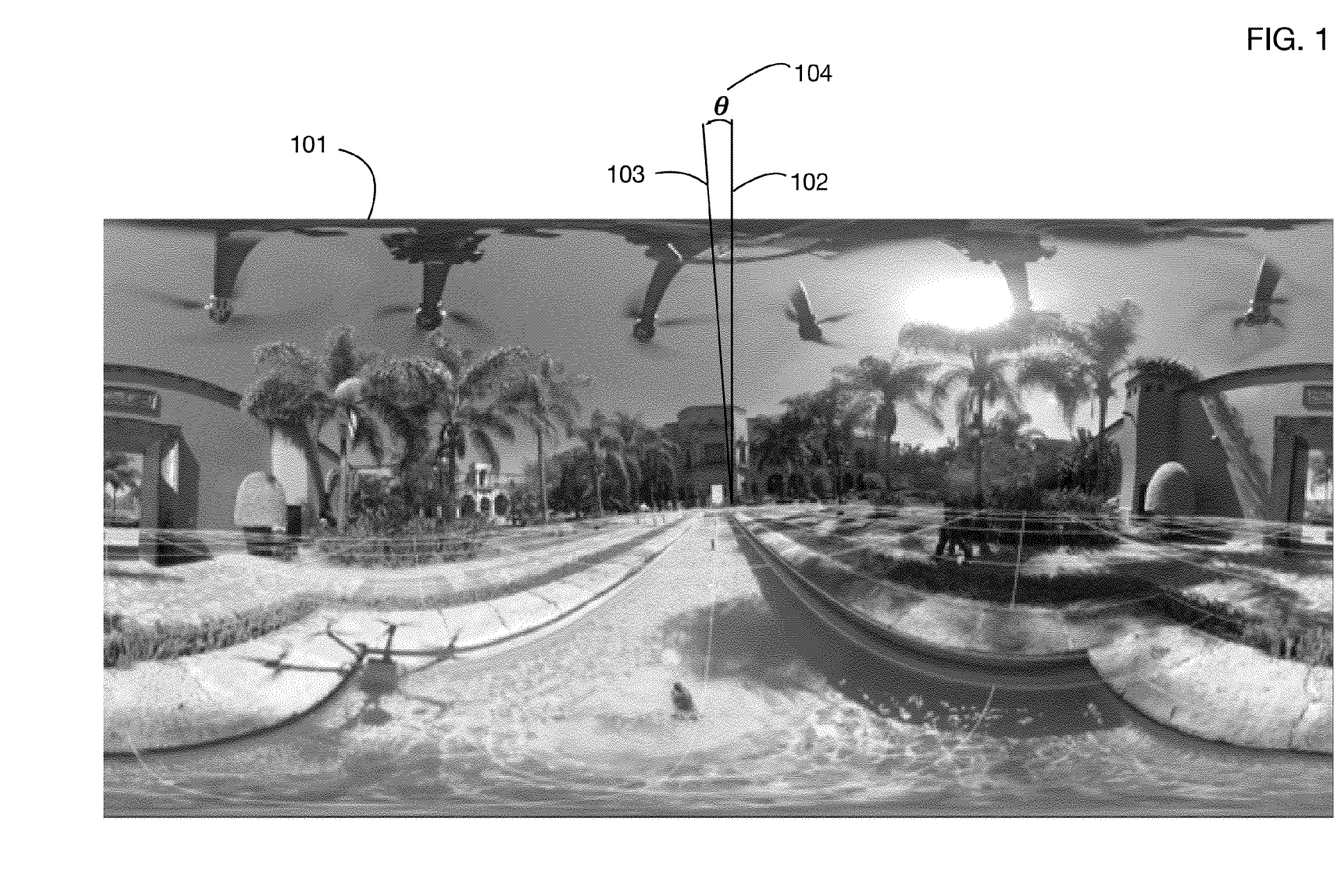
FIG. 1 illustrates a frame from a panoramic video with undesirable camera rotation.

FIG. 1 illustrates a panoramic video with a 360-degree horizontal field of view and also illustrates an example of a problem that one or more embodiments of the invention address. Panoramic frame 101 is a frame from a panoramic video. The panoramic video has been mapped to a sphere, and the frame 101 as shown is a latitude-longitude (equirectangular) projection of the sphere onto the plane. This exemplary panoramic video was captured by a multi-camera mount attached to a flying hexacopter drone. Because the drone does not always fly level to the ground, camera rotation is introduced in the panoramic video. This is visible in FIG. 1 where the building in the center appears tilted to the left. The upward normal direction 102 to the frame differs from the building's vertical direction 103 by angle 104 (θ). As shown the horizon at the base of the building that extends left and right is thus curved. As the drone flies, the orientation generally changes over time as well. One or more embodiments of the invention provide techniques to remove this undesirable camera rotation 104 from panoramic video frames. Other embodiments enable the introduction of rotation to enhance visual effects as well.

As shown in FIG. 1, undesirable rotation exists along the axis pointing towards the viewer. One or more embodiments may remove undesirable rotations on any axis or on any combination of axes. One or more embodiments may remove undesirable rotations from any type of panoramic video with any horizontal or vertical field of view. This example is for illustration only; embodiments may apply the techniques of the invention to any video regardless of the horizontal or vertical fields of view. One or more embodiments may for example, without limitation, remove undesirable rotations on any axis or combination of axes from video with 180-degree vertical and horizontal field of view, from video with 360-degree horizontal and 180-degree vertical field of view, from video with 360-degree horizontal and 120-degree vertical field of view, or from videos with any other combinations of fields of view.

Figure 2:
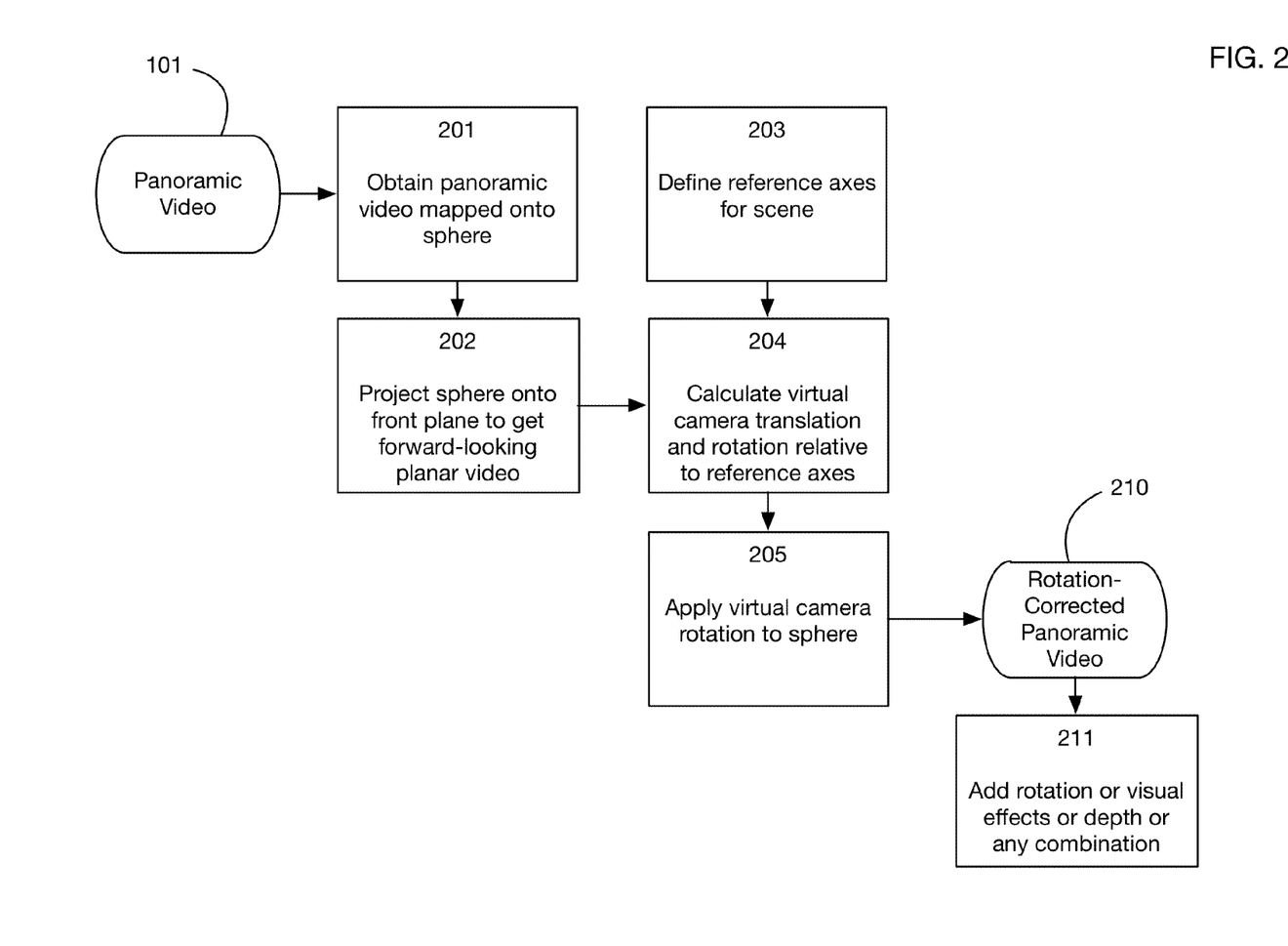
FIG. 2 shows a flowchart of one or more embodiments of the invention.

FIG. 2 illustrates a flowchart of a method employed by one or more embodiments of the system to transform a panoramic video 101 into a rotation-corrected panoramic video 210 with undesirable camera rotations removed as well. Embodiments may also utilize the rotation corrected video and further process the video, for example to add or introduce any rotation back into the video, for example bank the video more during a turn, or add visual effects, including any augmented reality, or add depth for 3D virtual or augmented reality viewing at 211, or any combination thereof. In step 201 an embodiment obtains a panoramic video mapped onto a sphere. One or more embodiments may obtain a panoramic video that has already been mapped onto a sphere; other embodiments may obtain a panoramic video in other formats and perform the mapping onto a sphere from these formats. One or more embodiments may use surfaces other than spheres for panoramic video, such as for example cylinders, cubes, combinations of planes, or any other surface or surfaces. Step 203 obtains reference axes for the scene for which the video was captured. Illustrative axes may for example have a y axis pointing upward from the ground, a z-axis pointing towards a viewer from a principal viewpoint, which depends on the scene and the application, and an x-axis perpendicular to the y and z axes. Embodiments may use any desired reference axes. Step 202 generates a forward-looking planar video from the spherically-mapped panoramic video. This forward-looking video projects the sphere for each panoramic frame onto a "front plane" that is in the forward direction relative to the reference axes defined in step 203. In many embodiments the front plane will be perpendicular to the ground plane, with the normal to the front plane pointing in a natural direction based on the scene or on the video capture process. For example, the normal to the front plane may be the z-axis, where the z-axis points towards a principal viewpoint. This example is for illustration only; embodiments may use any direction as the forward direction and may use any plane as the front plane. The forward-looking planar video provides a view from a virtual camera that points in the forward direction with the camera's view plane aligned with the front plane. It is a planar video, like a typical single camera video, rather than a panoramic sphere-mapped video such as the one shown in FIG. 1.

Step 204 calculates the virtual camera position and orientation for the forward-looking video at each of its frames. Because the cameras that capture a panoramic video may move during capture, this virtual camera position and orientation may change with each frame. Embodiments may use various methods to calculate the virtual camera translation and orientation. One such method that uses feature tracking is described below. One or more embodiments may use any desired method to calculate virtual camera translation and orientation. For example, one or more embodiments may use any known techniques of image processing on the forward-looking planar video frames to estimate or derive the virtual camera position and orientation. One or more embodiments may use sensor data captured during video capture to estimate the position and orientation of the virtual camera at each frame. One or more embodiments may use 3D scanner data captured during video capture to estimate the position and orientation of the virtual camera at each frame. One or more embodiments may use any combinations of the above methods.

Step 205 applies the virtual camera rotation calculated in step 204 to the sphere onto which the panoramic video is mapped in step 201. This step effectively reverses the undesired camera rotation in the panoramic video, by bringing the sphere into alignment with the camera. The result of this rotation is the rotation-corrected panoramic video 210. After rotating the sphere in step 205, the corrected panoramic video is still mapped onto the sphere. One or more embodiments may generate other panoramic video formats or projections after correcting the rotation, such as for example a cylindrical projection, a cubical projection, or a projection onto any other surface. Embodiments may also utilize the rotation corrected video 210 and further process the video, for example to add or introduce any rotation back into the video, for example bank the video more during a turn, or add visual effects, including any augmented reality, or add depth for 3D virtual or augmented reality viewing at 211, or any combination thereof.

Figure 3:
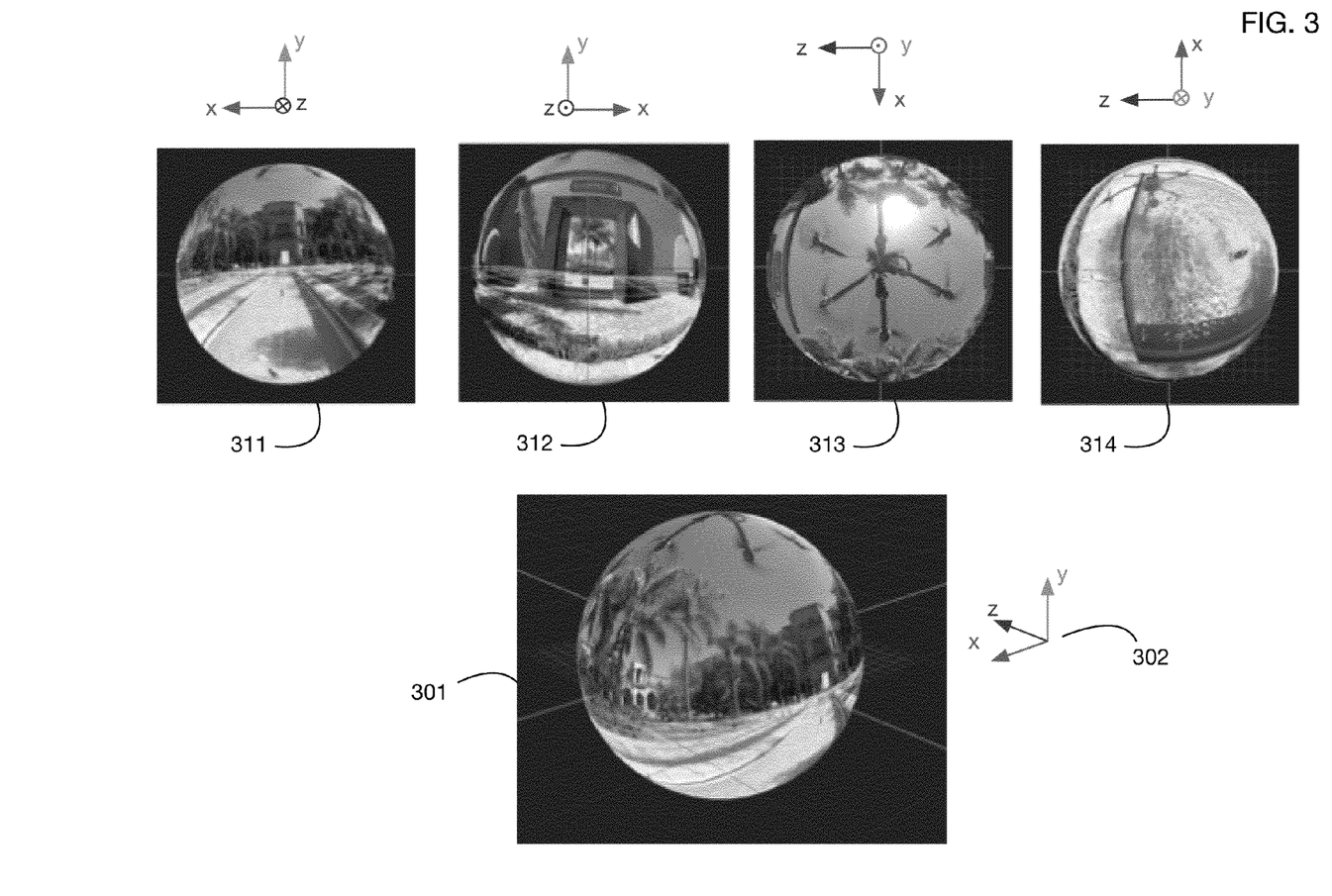
FIG. 3 illustrates the mapping of a panoramic video to a sphere.

The examples that follow are for illustration; any embodiment that transforms a panoramic video into a rotation-corrected panoramic video may be utilized in embodiments of the invention. Step 201 of FIG. 2 obtains a panoramic video mapped onto a sphere. FIG. 3 illustrates this mapping onto a sphere for the panoramic video frame shown in FIG. 1. In FIG. 3 the panoramic frame 101 is mapped onto a sphere, and FIG. 3 shows several views of this spherically mapped panoramic frame. 301 is an oblique view of the sphere; 311 is a front view; 312 is a back view; 313 is a top view; and 314 is a bottom view. FIG. 3 also illustrates step 203 from FIG. 2—defining reference axes for the scene. Reference axes 302 are shown for the oblique view 301, and the corresponding orientation of these axes is shown above each of the sphere views 311, 312, 313, and 314. In this illustrative example, the y axis points upwards from the ground, and the z-axis points towards the viewer as the viewer is looking along the water pool towards the central tower. The selection of the z-axis for this example is based on the geometry of the scene and on the trajectory of the camera mount that captured the scene. Embodiments may set the axes to any convenient orientations based on the application. The images shown of the sphere are images looking from the outside of the sphere towards the center of the sphere. The cameras that captured these images are positioned at the center of the sphere; thus the viewer is looking from the center of the sphere outwards.

Figure 4:
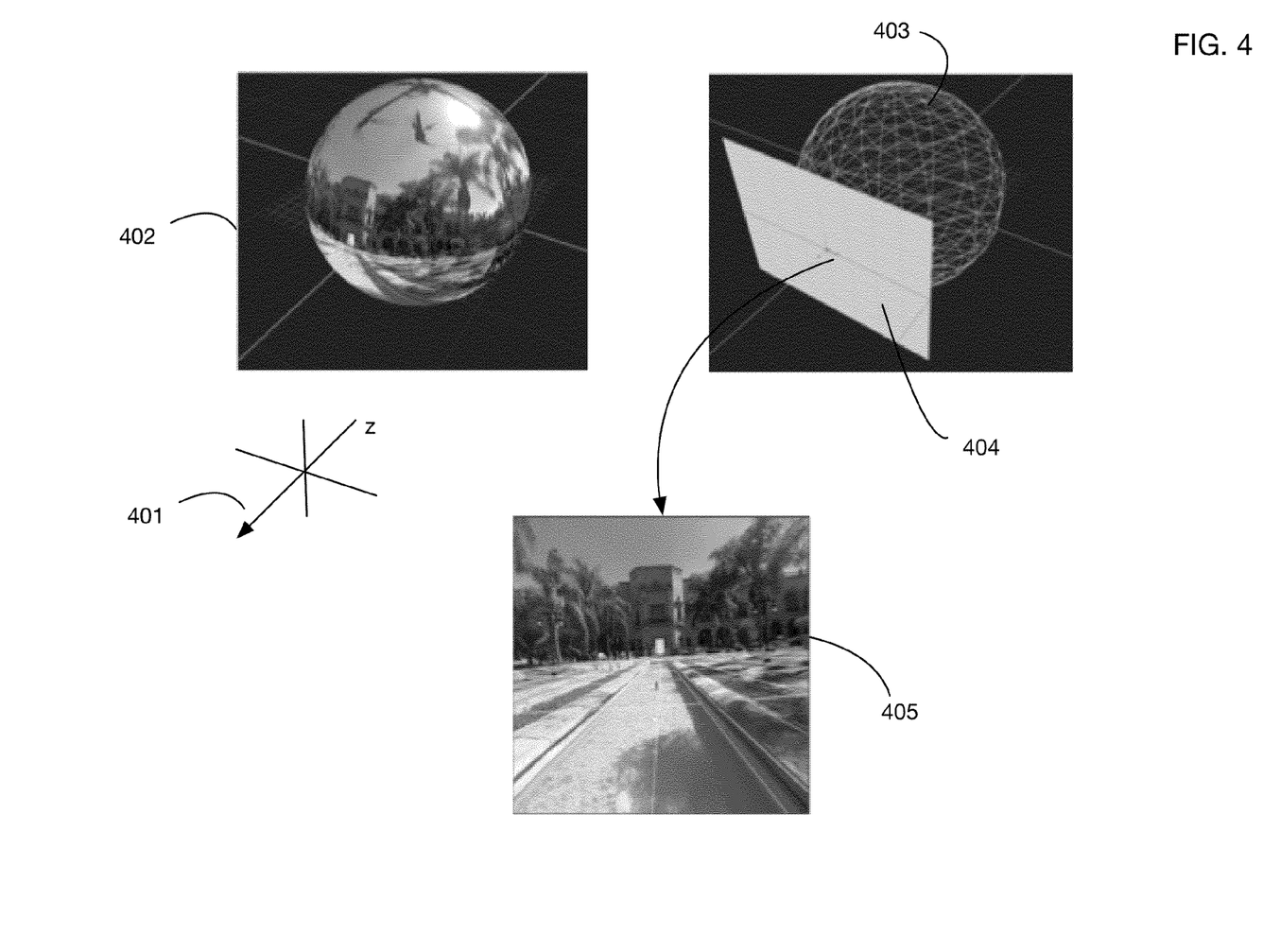
FIG. 4 illustrates one of the steps of one or more embodiments of the invention where a spherically mapped panoramic frame is projected onto a forward-looking plane in preparation for image analysis.

FIG. 4 illustrates step 202, namely projecting the sphere onto a front plane to obtain a forward-looking planar video. As discussed above, the choice of a "front plane" and a "forward direction" is application-specific. In this illustrative example, the forward direction is selected to be in the negative z-axis direction 401. Spherically mapped panoramic frame 402 shows a view of the sphere corresponding to the axis orientations 401. The front plane 404 is positioned in front of sphere 403 based on this forward direction 401. Projecting spherically mapped image 402 onto plane 404 generates planar frame 405, which shows the view of a user looking in the forward direction.

Figure 5:
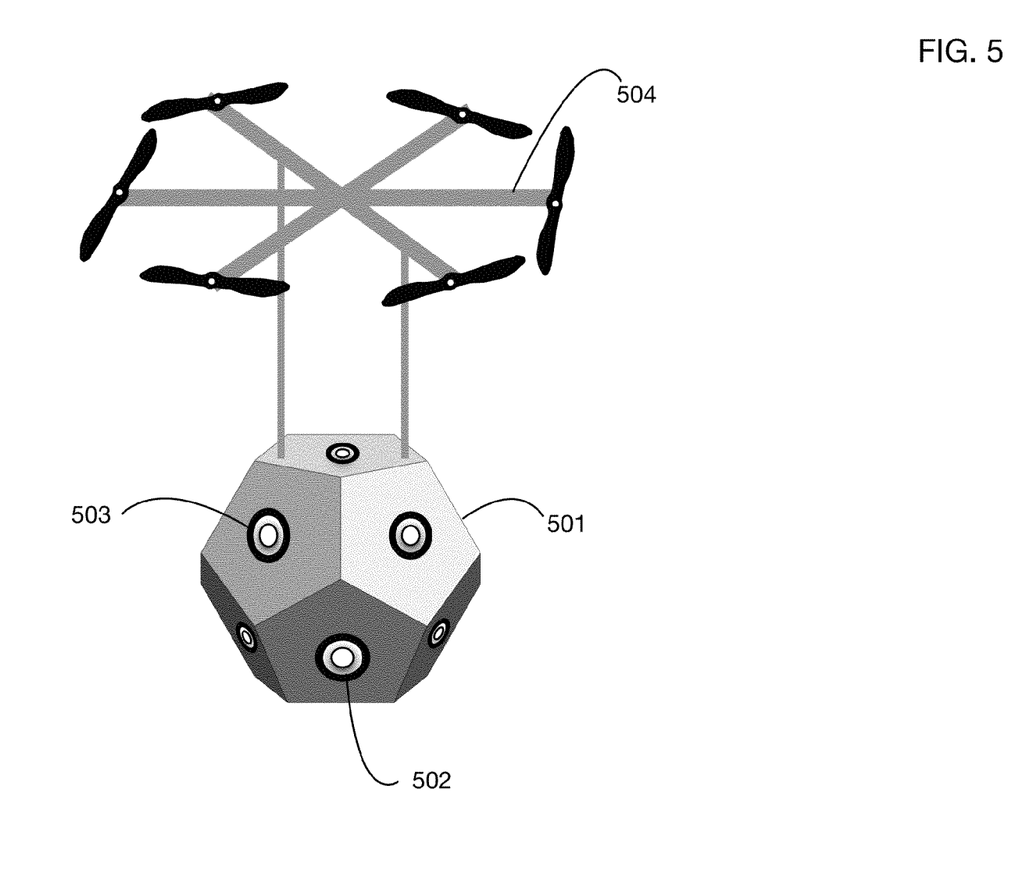
FIG. 5 shows an illustrative camera mount that may be used by one or more embodiments of the invention to capture panoramic video.

One or more embodiments may include additional steps to generate the spherically mapped panoramic video as illustrated for example in FIG. 4. For example, one or more embodiments may create the spherically mapped panoramic video by stitching together video captured from several cameras, each with a different field of view of the scene. FIG. 5 illustrates an embodiment that obtains video from a multi-camera system. In this system, camera mount 501 includes several cameras, such as camera 502 and camera 503, each of which is aimed in a different direction. Collectively the cameras in mount 501 form a complete 360-degree horizontal and 180-degree vertical view of the scene. The dodecahedral mount 501 is for illustration; embodiments may obtain multiple videos from any number of cameras in any relative orientation.

The illustrative camera mount 501 is coupled to a drone 504, similar to the hexacopter illustrated in FIG. 1. One or more embodiments may obtain video from one or more cameras coupled to one or more drones or to any other device that is either fixed or moving. Drone-mounted cameras provide a particularly challenging issue of camera rotation because they are not in fixed orientations relative to the ground; embodiments of the invention are therefore well-suited to correcting undesired camera rotation for panoramic video captured from drone-mounted cameras.

Figure 6:
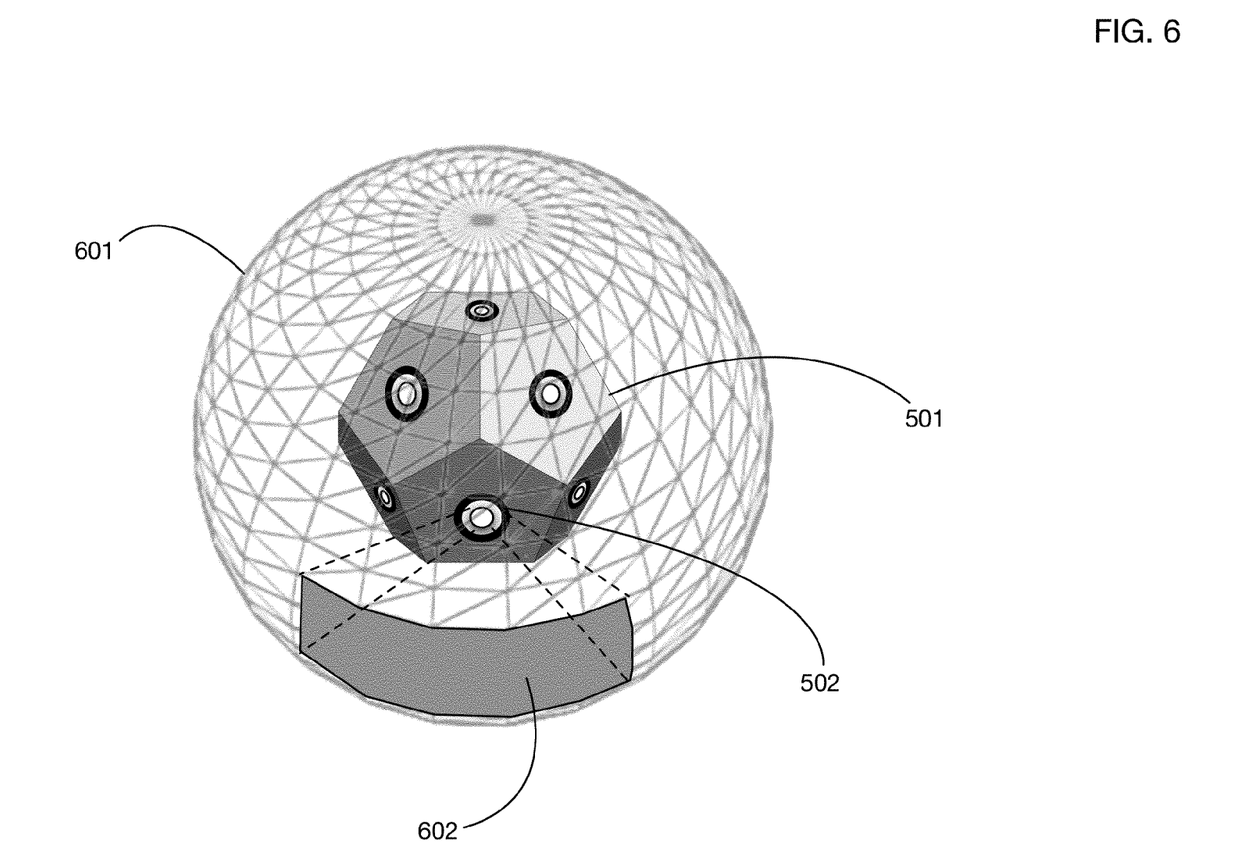
FIG. 6 illustrates determining a spherical region for the field of view of each camera for the illustrative camera mount of FIG. 5.

Continuing with the example from FIG. 5 of generating a spherically mapped panoramic video from a multi-camera system, FIG. 6 illustrates an exemplary method for mapping videos obtained from these cameras onto a sphere. A reference sphere 601 is defined surrounding the camera mount 501. One or more embodiments may place the center of this reference sphere at the focal point of one or more of the cameras on the camera mount 501. In this illustrative example, the relative orientation of each of the cameras relative to the mount 501 is known from the geometry of the camera mount. Therefore it is straightforward to map the field of view of each camera onto a spherical region on the reference sphere 601. FIG. 6 illustrates this process for camera 502 on mount 501; the intersection of the field of view of camera 502 with the reference sphere 601 is spherical region 602. Creating a spherically mapped panoramic video frame from the individual camera frames may be done by mapping each camera frame to its corresponding spherical region (such as 602). Frames from each camera that were captured at approximately the same time are mapped onto the sphere to form a single spherically mapped panoramic frame. In some embodiments it may be necessary or desirable to synchronize the separate camera videos prior to combining them, if for example the cameras cannot access a common clock during capture. In some embodiments the separate cameras may capture frames at different rates or in different formats; preprocessing the video streams may therefore be performed in one or more embodiments to prepare for combining of these video streams into a panoramic video. In or more embodiments, the resulting spherically mapped composite panoramic frame may exhibit artifacts or discontinuities due for example to differences in lighting conditions, shadows, slight camera misalignments, or other factors. Therefore one or more embodiments may employ a blending step that blends the spherically mapped regions (like 602) from each camera frame into an overall spherically mapped panoramic frame. Techniques for blending and stitching images into panoramic frames are known in the art. Embodiments of the invention may use any of these known techniques to stitch and blend individual camera images into spherically mapped panoramic frames, or into panoramic frames mapped onto any other surface or surfaces.

Figure 7:
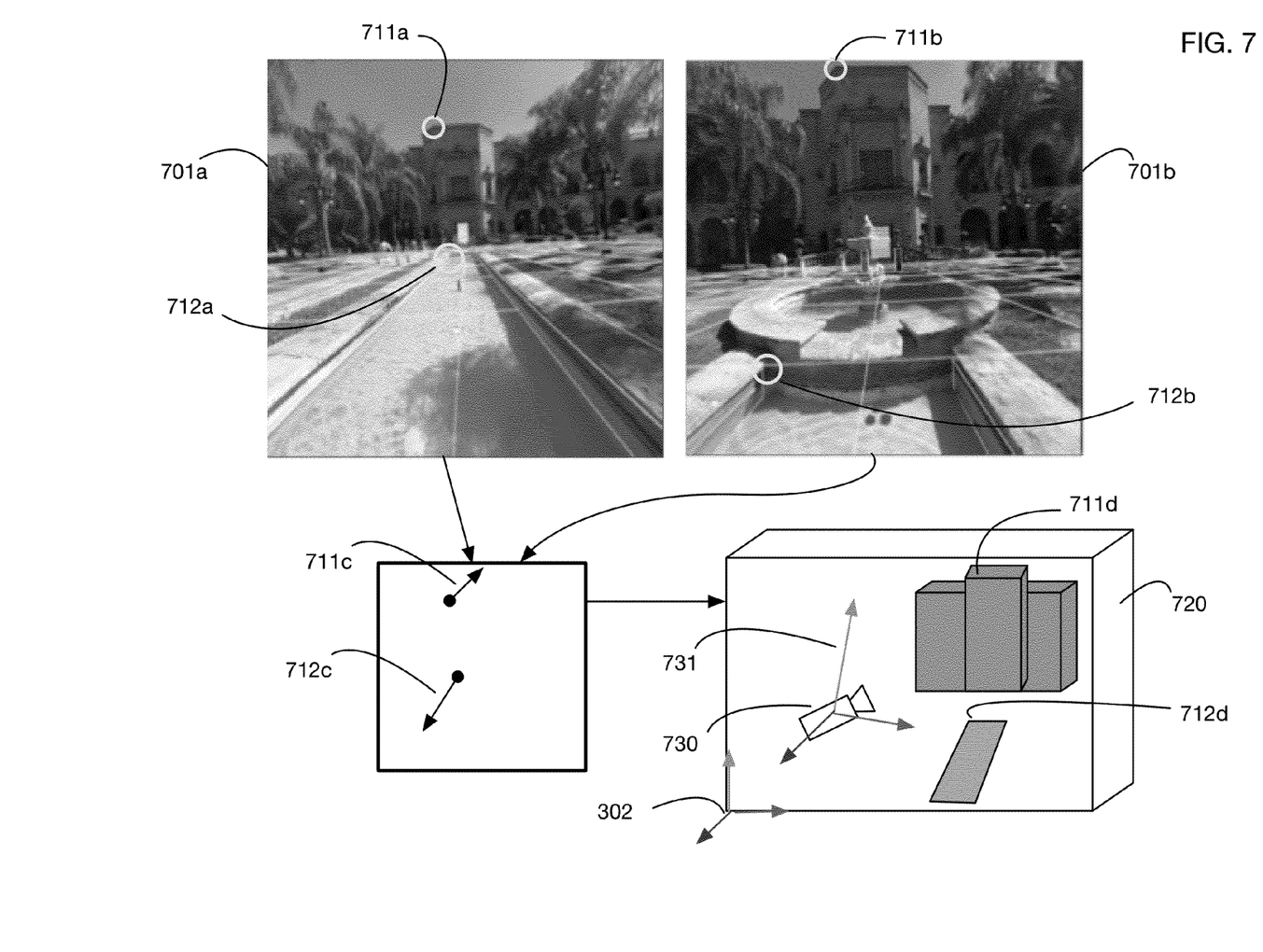
FIG. 7 illustrates a step used by one or more embodiments to determine camera rotation by tracking features across frames.

Step 201 describes how to generate or obtain a spherically mapped panoramic video while step 202 describes how to project this spherically mapped video onto a forward-looking planar video. Step 204 involves calculating virtual camera translation and virtual camera rotation for the forward-looking planar video. As described above, one or more embodiments of the invention may employ various techniques to calculate the virtual camera translation and orientation. FIG. 7 illustrates an embodiment that uses a technique based on feature tracking. Deriving camera position and orientation from feature tracking is known in the art, and is supported in several available software packages. For example, the Nuke® software application provides a camera tracking feature that derives the position and orientation of a camera from the features in a sequence of frames. One or more embodiments of the invention may use any of the techniques known in the art to calculate camera position and orientation from image information. The discussion below summarizes features of one potential embodiment of these techniques.

Feature tracking techniques identify the pixel location of one or more features in one or more key frames, and then search for these features in the entire sequence of frames for the video. The changes of pixel locations for the features may then be used to derive the camera position and orientation in each frame, as well as the 3D positions of each feature in the scene. Feature tracking methods typically require that the selected features represent objects in the scene that do not move during the video capture. FIG. 7 illustrates an example of this technique. Frame 701a is selected as a key frame. An operator, or an automated system, identifies features in the frame that can be tracked in subsequent (or previous) frames. In FIG. 7, feature 711a (the corner of the front tower) and feature 712a (the corner of the water pool) are selected. In this illustrative example, the drone continues to move forward towards the tower after the capture of frame 701a. In subsequent frame 701b, feature 711a has moved to pixel location 711b, and feature 712a has moved to pixel location 712b. The locations 711b and 712b may be located automatically in one or more embodiments. In one or more embodiments an operator may locate features in frames, or a combination of manual and automated feature tracking may be used.

Combining frames 701a and 701b generates feature track 711c for feature 711a, and feature track 712c for feature 711b. As is known in the art, with enough feature tracks like 711c and 712c it is possible to derive the 3D position of each feature in the scene, as well as the position and orientation of the virtual camera in each frame of the video. One methodology used in the art, for example, is to calculate a best fitting 3D geometry model for the position of features and the position and orientation of the virtual camera, where the best fitting model corresponds most closely to the observed feature tracks. This methodology projects the 3D position of each feature onto the view plane defined by the virtual camera position and orientation, and compares the projected pixel position of each feature in each frame to its actual pixel location in the frame. The 3D geometry model with minimum error between the projected feature positions and the actual feature positions is selected as the best fitting model.

FIG. 7 illustrates the result of this model fitting process, where 3D geometry model 720 is generated based on feature tracks 711c and 712c. (Use of two feature tracks is for illustration; embodiments may use any number of feature tracks to generate 3D geometry models.) 3D geometry model 720 defines a 3D position 711d for feature 711a, and a 3D position 712d for feature 712a. In addition, for this specific frame, the 3D geometry model defines location 730 for the virtual camera that captured the frame, as well as the orientation 731 of this virtual camera. For 3D stereoscopic viewing, camera 730 may be implemented as, or an additional paired camera may be generated, to create two cameras separated by a predefined interocular distance, for example roughly the distance between human pupils. Since the reference axes 302 have been defined for the scene, the translation and rotation of the virtual camera 730 relative to these reference axes may be calculated directly. In addition, the depth information accepted by the system for points 711d and 712d may be utilized to add depth to the images in the video to create stereoscopic videos at 211.

Figure 8:
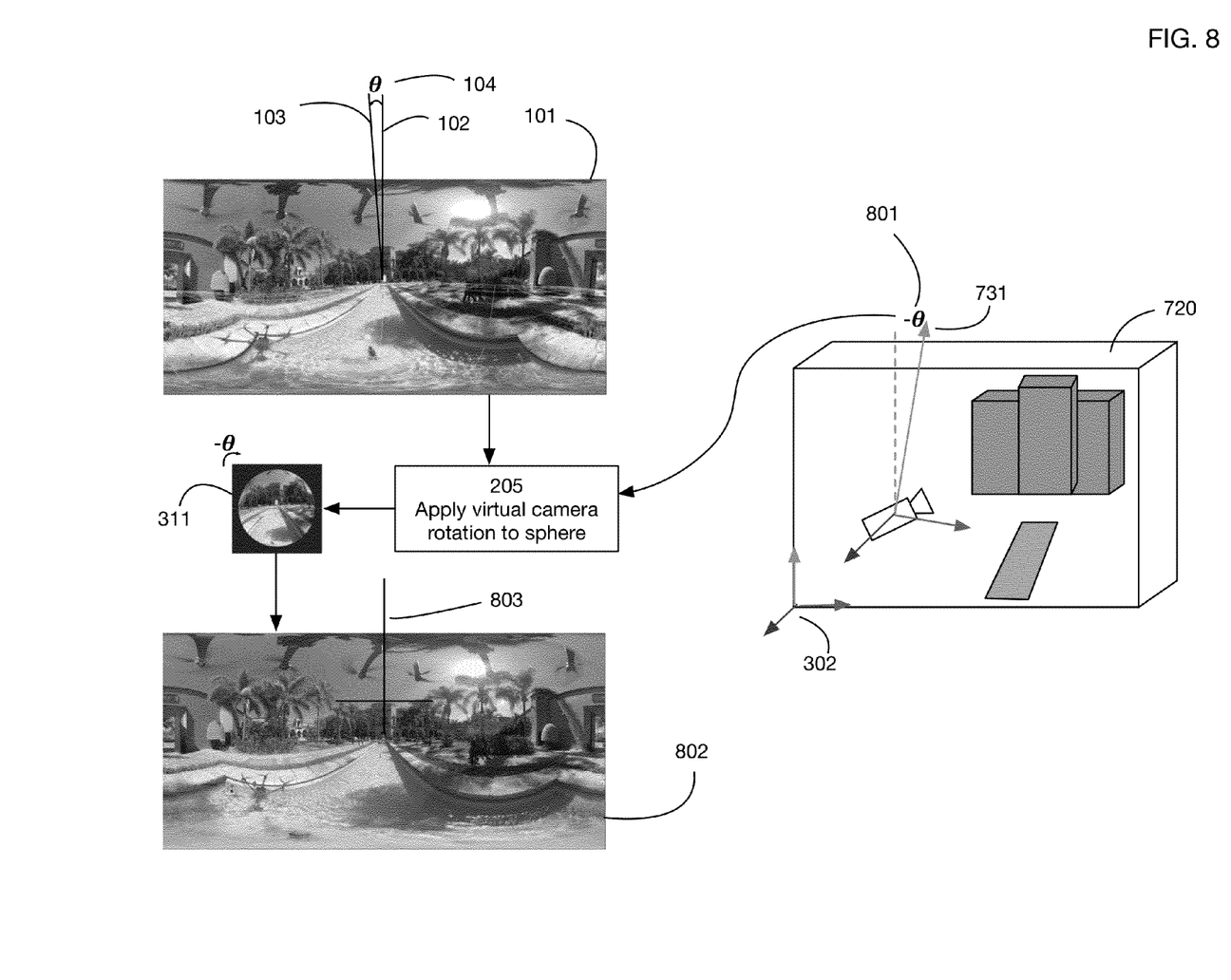
FIG. 8 illustrates a step used by one or more embodiments to correct undesirable camera rotation in a panoramic video frame based on a 3D geometry model of each frame.

FIG. 8 illustrates how the virtual camera rotation derived in FIG. 7 may be used in one or more embodiments to remove undesired camera rotation from panoramic video frames. From the 3D geometry model 720 derived in FIG. 7, virtual camera rotation 801 is derived by comparing the virtual camera orientation 731 to the reference axes 302. For illustration, rotation in this example is shown only around the z axis. The techniques illustrated here may be employed by one or more embodiments to remove undesired rotation around any axis or any combination of axes. The camera rotation 801 (−θ) is the opposite of the apparent image rotation 104 observed in frame 101, as described in FIG. 1. (For more general rotations around multiple axes, the camera rotation is the inverse of the apparent image rotation, when viewed on the sphere onto which the panoramic video frame is mapped.) Therefore step 205 applies the virtual camera rotation 801 to the sphere 311 in order to remove the apparent image rotation (which is in the opposite direction). The result of this correction is shown in frame 802, which is the latitude-longitude projection of sphere 311 after applying rotation 801. The tilt 103 of the building observed in frame 101 is corrected and the perpendicular 803 to the building is correctly normal to the frame.

Figure 9:
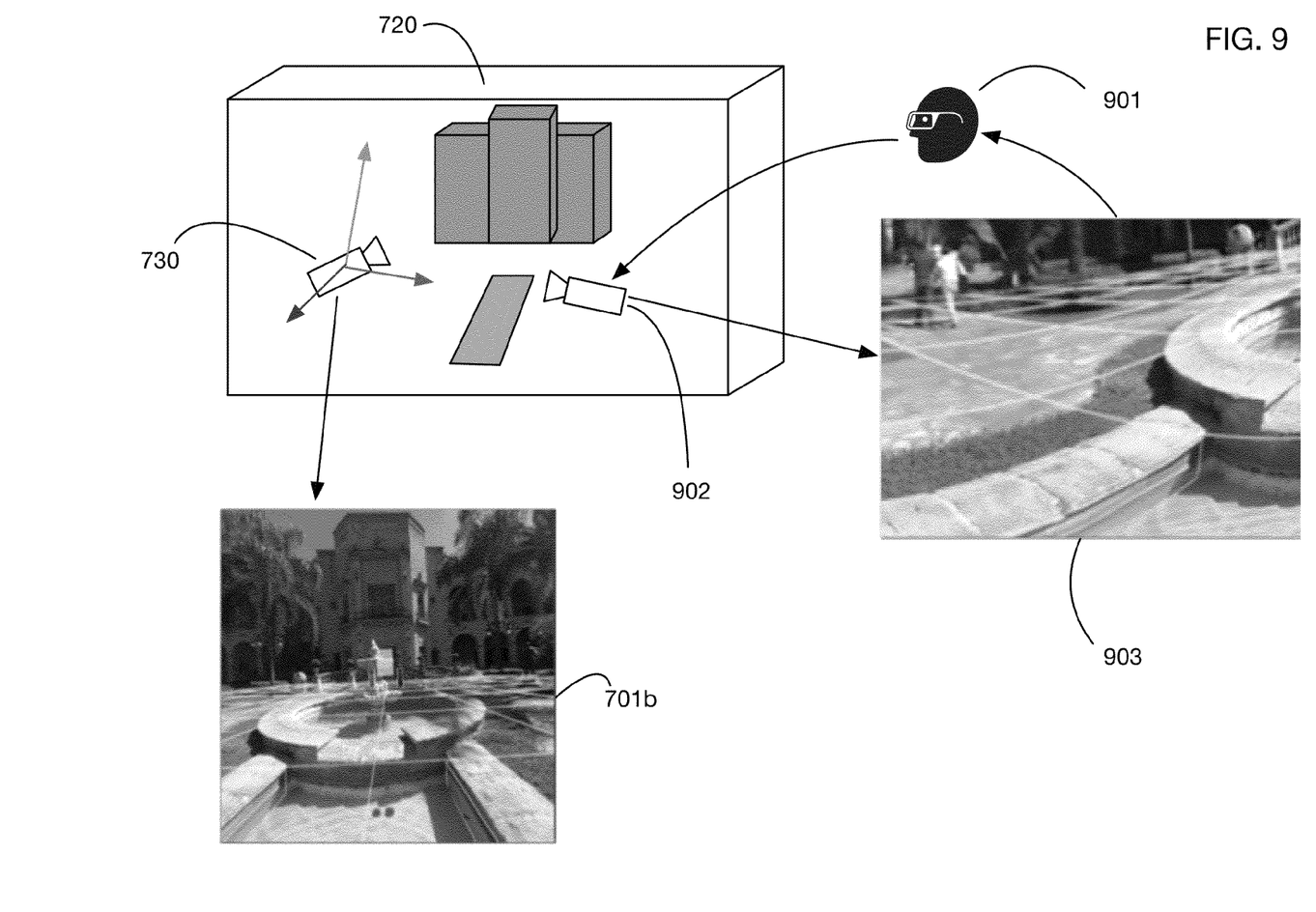
FIG. 9 illustrates use of a three-dimensional geometry model generated by feature tracking to create a virtual reality environment.

One or more embodiments may use the 3D geometry model data generated from feature tracking (or otherwise generated) to generate a virtual reality environment. FIG. 9 illustrates an embodiment that creates a virtual reality environment from 3D geometry model 720 illustrated in FIG. 7. User 901 has virtual reality goggles equipped with one or more sensors that detect for example the user's position and orientation. Based on these sensors or on other information, a virtual camera 902 is created in the 3D environment 720. Scene 903 is rendered from the perspective of this virtual camera, onto an image plane associated with the virtual camera, and is displayed on the goggles of the user 901. The rendered scene 903 may be an image that was not captured directly by the camera 730 corresponding to the originally captured panoramic video. For example, the originally video included frame 701b facing the tower; the virtual reality image 903 faces in a different direction. One or more embodiments may combine 3D geometry model information 720 with one or more panoramic videos to generate a virtual reality environment. For example, one or more embodiments may project the panoramic video initially onto a sphere, as illustrated for example in FIG. 3, and then modify this projection based on a 3D geometry model such as model 720 illustrated in FIG. 7. For instance, based on the 3D positions of features in the 3D geometry model 720, pixels on the mapped sphere may be moved to different positions in 3D space, so that the resulting panoramic projection is onto a non-spherical surface that reflects more accurately the depth of objects in the scene.

In addition, depth accepted by the system for points 711d and 712d for example may be utilized in the stabilized video to create stereoscopic viewing by assigning those depths to the particular features in the video. As the camera pose changes, the depth may be automatically adjusted by the system to take into account the motion of the drone, and thus provide for accurate depth in stereoscopic virtual reality environments. Any color correction or other visual effects may also be performed on the stabilized images and any additional augmented information may also be added to the stabilized video without the need to adjust the orientation as with non-stabilized video as the camera moves, and for example wobbles during flight when obtained from a typical drone.

While the invention herein disclosed has been described by means of specific embodiments and applications thereof, numerous modifications and variations could be made thereto by those skilled in the art without departing from the scope of the invention set forth in the claims.

What is claimed is:

1. A method to remove camera rotation from a panoramic video comprising
   obtaining a panoramic video of a scene in a three-dimensional space, wherein each panoramic frame of said panoramic video is mapped onto a sphere to form a spherically mapped panoramic frame;
   accepting reference axes that define said three-dimensional space;
   projecting each of said spherically mapped panoramic frames onto a front plane to create a forward-looking planar video;
   calculating a virtual camera rotation and a virtual camera translation, relative to said reference axes, for each planar frame of said forward-looking planar video;
      wherein said calculating said virtual camera rotation and said virtual camera translation, relative to said reference axes, for each planar frame of said forward-looking planar video comprises
         identifying and locating a plurality of features in one or more key frames of said forward-looking planar video, wherein each of said plurality of features has a fixed position in said three-dimensional space;
         tracking the pixel location of each of said plurality of features across the planar frames of said forward-looking planar video to create a feature track for each of said plurality of features;
         calculating a 3D geometry model from said feature tracks that comprises
            the position of each of said plurality of features in said three-dimensional space;
            the virtual camera rotation and the virtual camera translation, relative to said reference axes, for each planar frame of said forward-looking planar video;
         wherein said 3D geometry model minimizes the error between
            the projection of said position of each of said plurality of features onto a view plane defined by said virtual camera rotation and said virtual camera translation for each planar frame of said forward-looking planar video, and
            said pixel location of each of said plurality of features in each of said feature tracks;
         obtaining said virtual camera rotation and said virtual camera translation from said 3D geometry model;
   applying said virtual camera rotation to said sphere in each of said spherically mapped panoramic frames to generate a rotation-corrected panoramic frame for each of said spherically mapped panoramic frames;
   combining said rotation-corrected panoramic frames to form a rotation-corrected panoramic video.

2. The method of claim 1, wherein said obtaining said panoramic video comprises
   obtaining a plurality of videos of said scene, each captured by a corresponding camera from a plurality of cameras, wherein all of said plurality of videos are captured over a common time interval;
   selecting a sequence of frame sample times within said common time interval;
   for each of said frame sample times and
      for each of said plurality of cameras mapping the camera frame that was captured from said camera approximately at said frame sample times onto said sphere, to form a spherically mapped camera frame;
combining said spherically mapped camera frames to form said spherically mapped panoramic frame for said frame sample times.

3. The method of claim 2, wherein
said obtaining a plurality of videos of said scene comprises
attaching said plurality of cameras to a camera mount;
placing said camera mount in said scene;
capturing said plurality of videos from said plurality of cameras over said common time interval.

4. The method of claim 3, wherein said camera mount is coupled to a drone.

5. The method of claim 3, further comprising
accepting a definition of a reference sphere surrounding said camera mount;
calculating a spherical region for each of said plurality of cameras as the intersection of the field of view of each of said plurality of cameras with the surface of said reference sphere;
wherein said mapping the camera frame that was captured from said camera approximately at said frame sample times onto said sphere comprises
projecting said camera frame onto said spherical region for the corresponding camera.

6. The method of claim 1, further comprising
generating a virtual reality environment from said 3D geometry model;
obtaining a position and orientation of a user in said virtual reality environment;
generating a view image for said user in said virtual reality environment by
calculating an image plane for said user in said virtual environment based on said position and orientation of said user;
projecting each of said plurality of features from said position of each of said plurality of features onto said image plane.

7. The method of claim 1, further comprising
accepting input depths to assign a plurality of features in said forward-looking planar video that comprises the position of each of said plurality of features in said three-dimensional space;
generating a 2D presentation or 3D stereoscopic presentation to display in a virtual reality or augmented reality viewing device.

8. A method for removing camera rotation from a panoramic video comprising
attaching a plurality of cameras to a camera mount;
placing said camera mount in a scene in a three-dimensional space;
capturing a plurality of videos from said plurality of cameras over a common time interval;
translating and rotating said camera mount in said scene over said common time interval;
defining reference axes for said three-dimensional space;
defining a reference sphere surrounding said camera mount;
calculating a spherical region for each of said plurality of cameras as the intersection of the field of view of each of said plurality of cameras with the surface of said reference sphere;
selecting a sequence of frame sample times within said common time interval;
for each of said frame sample times and
for each of said plurality of cameras
projecting the camera frame that was captured from said camera approximately at said frame sample times onto said spherical region for the corresponding camera, to form a spherically mapped camera frame;
blending said spherically mapped camera frames;
combining said spherically mapped camera frames to form a spherically mapped panoramic frame for said frame sample times;
projecting each of said spherically mapped panoramic frames onto a front plane to create a forward-looking planar video;
obtaining depths by either or both of
identifying and locating a plurality of features in one or more key frames of said forward-looking planar video, wherein each of said plurality of features has a fixed position in said three-dimensional space; tracking the pixel location of each of said plurality of features across the planar frames of said forward-looking planar video to create a feature track for each of said plurality of features; calculating a 3D geometry model from said feature tracks that comprises the position of each of said plurality of features in said three-dimensional space; the virtual camera rotation and the virtual camera translation, relative to said reference axes, for each planar frame of said forward-looking planar video; wherein said 3D geometry model minimizes the error between the projection of said position of each of said plurality of features onto a view plane defined by said virtual camera rotation and said virtual camera translation for each planar frame of said forward-looking planar video; and said pixel location of each of said plurality of features in each of said feature tracks; obtaining said virtual camera rotation and said virtual camera translation from said 3D geometry model;
or
accepting input depths to assign a plurality of features in said forward-looking planar video that comprises the position of each of said plurality of features in said three-dimensional space; generating a 2D presentation or 3D stereoscopic presentation to display in a virtual reality or augmented reality viewing device;
applying said virtual camera rotation to said sphere in each of said spherically mapped panoramic frames to generate a rotation-corrected panoramic frame for each of said spherically mapped panoramic frames;
combining said rotation-corrected panoramic frames to form a rotation-corrected panoramic video; generating a virtual reality environment from said 3D geometry model; obtaining a position and orientation of a user in said virtual reality environment; generating a view image for said user in said virtual reality environment by calculating an image plane for said user in said virtual environment based on said position and orientation of said user; projecting each of said plurality of features from said position of each of said plurality of features onto said image plane.

9. A system to remove camera rotation from a panoramic video comprising
obtain a panoramic video of a scene in a three-dimensional space, wherein each panoramic frame of said panoramic video is mapped onto a sphere to form a spherically mapped panoramic frame;
accept reference axes that define said three-dimensional space;

project each of said spherically mapped panoramic frames onto a front plane to create a forward-looking planar video;

calculate a virtual camera rotation and a virtual camera translation, relative to said reference axes, for each planar frame of said forward-looking planar video;

wherein said calculate said virtual camera rotation and said virtual camera translation, relative to said reference axes, for each planar frame of said forward-looking planar video comprises identify and locating a plurality of features in one or more key frames of said forward-looking planar video, wherein each of said plurality of features has a fixed position in said three-dimensional space;

track the pixel location of each of said plurality of features across the planar frames of said forward-looking planar video to create a feature track for each of said plurality of features;

calculate a 3D geometry model from said feature tracks that comprises the position of each of said plurality of features in said three-dimensional space;

the virtual camera rotation and the virtual camera translation, relative to said reference axes, for each planar frame of said forward-looking planar video;

wherein said 3D geometry model minimizes the error between the projection of said position of each of said plurality of features onto a view plane defined by said virtual camera rotation and said virtual camera translation for each planar frame of said forward-looking planar video, and said pixel location of each of said plurality of features in each of said feature tracks;

obtain said virtual camera rotation and said virtual camera translation from said 3D geometry model;

apply said virtual camera rotation to said sphere in each of said spherically mapped panoramic frames to generate a rotation-corrected panoramic frame for each of said spherically mapped panoramic frames;

combine said rotation-corrected panoramic frames to form a rotation-corrected panoramic video.

10. The system of claim 9, wherein said obtain said panoramic video comprises obtain a plurality of videos of said scene, each captured by a corresponding camera from a plurality of cameras, wherein all of said plurality of videos are captured over a common time interval;

select a sequence of frame sample times within said common time interval;

for each of said frame sample times and
  for each of said plurality of cameras
    map the camera frame that was captured from said camera approximately at said frame sample times onto said sphere, to form a spherically mapped camera frame;

combine said spherically mapped camera frames to form said spherically mapped panoramic frame for said frame sample times.

11. The system of claim 10, wherein said obtain said plurality of videos of said scene comprises
  attach said plurality of cameras to a camera mount;
  place said camera mount in said scene;
  capture said plurality of videos from said plurality of cameras over said common time interval.

12. The system of claim 11, wherein said camera mount is coupled to a drone.

13. The system of claim 11, further comprising accept a definition of a reference sphere surrounding said camera mount;

calculate a spherical region for each of said plurality of cameras as the intersection of the field of view of each of said plurality of cameras with the surface of said reference sphere;

wherein said mapping the camera frame that was captured from said camera approximately at said frame sample times onto said sphere comprises
  project said camera frame onto said spherical region for the corresponding camera.

14. The system of claim 9, further comprising generate a virtual reality environment from said 3D geometry model;

obtain a position and orientation of a user in said virtual reality environment;

generate a view image for said user in said virtual reality environment through
  calculate an image plane for said user in said virtual environment based on said position and orientation of said user;
  project each of said plurality of features from said position of each of said plurality of features onto said image plane.

15. The system of claim 9, further comprising accept input depths to assign a plurality of features in said forward-looking planar video that comprises the position of each of said plurality of features in said three-dimensional space;

generate a 2D presentation or 3D stereoscopic presentation to display in a virtual reality or augmented reality viewing device.

16. The method of claim 2, further comprising:
blending said spherically mapped camera frames.

17. The method of claim 3, further comprising:
translating and rotating said camera mount in said scene over said common time interval.

18. The system of claim 10, further comprising:
blend said spherically mapped camera frames.

19. The system of claim 11, further comprising:
translate and rotate said camera mount in said scene over said common time interval.

* * * * *